(12) United States Patent
Xi

(10) Patent No.: US 11,663,022 B2
(45) Date of Patent: May 30, 2023

(54) METHOD AND APPARATUS FOR DISPLAYING WIDGET

(71) Applicant: BEIJING DAJIA INTERNET INFORMATION TECHNOLOGY CO., LTD., Beijing (CN)

(72) Inventor: Da Xi, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/328,692

(22) Filed: May 24, 2021

(65) Prior Publication Data

US 2021/0389961 A1 Dec. 16, 2021

(30) Foreign Application Priority Data

Jun. 15, 2020 (CN) .......................... 202010542784.6

(51) Int. Cl.
| | | |
|---|---|---|
| G06F 3/048 | (2013.01) | |
| G06F 9/451 | (2018.01) | |
| G06F 3/04817 | (2022.01) | |
| G06F 3/0488 | (2022.01) | |

(52) U.S. Cl.
CPC ............ G06F 9/451 (2018.02); G06F 3/0488 (2013.01); G06F 3/04817 (2013.01)

(58) Field of Classification Search
CPC ........... H04N 21/2187; H04N 21/4622; H04N 21/41407; H04N 21/4788
See application file for complete search history.

(56) References Cited

U.S. PATENT DOCUMENTS

| | | | |
|---|---|---|---|
| 2013/0191733 | A1 | 7/2013 | Jang et al. |
| 2015/0111192 | A1* | 4/2015 | Mihai ...................... G09B 7/02 434/362 |
| 2016/0266733 | A1* | 9/2016 | Alon ...................... G06F 3/0484 |
| 2016/0277802 | A1* | 9/2016 | Bernstein ......... H04N 21/41407 |
| 2017/0200202 | A1* | 7/2017 | Yu ....................... G06Q 30/0277 |
| 2017/0366579 | A1* | 12/2017 | Assuncao Aguiar ...................... G06F 3/04845 |

(Continued)

FOREIGN PATENT DOCUMENTS

| | | |
|---|---|---|
| CN | 104516647 A | 4/2015 |
| CN | 106293315 A | 1/2017 |

(Continued)

OTHER PUBLICATIONS

Bjarnason et al., Evidence-Based Timelines for Project Retrospectives—A Method for Assessing Requirements Engineering in Context, 2012, IEEE; 8 pages.*

(Continued)

*Primary Examiner* — Linh K Pham
(74) *Attorney, Agent, or Firm* — Foley & Lardner LLP

(57) ABSTRACT

Systems, methods, and non-transitory computer-readable media for displaying a widget includes acquiring display content and timing duration of the widget based on a task achieved by a current page, displaying the widget with the display content on the current page and recording time information, and updating the widget for displaying that the task is in a completed state in response to the displaying duration reaching to the timing duration. The time information is used for indicating displaying duration of the widget.

19 Claims, 2 Drawing Sheets

(56) References Cited

U.S. PATENT DOCUMENTS

| | | | | |
|---|---|---|---|---|
| 2018/0234738 A1* | 8/2018 | Sarkar | ............... | H04N 21/4788 |
| 2019/0075340 A1 | 3/2019 | Hochart | | |
| 2019/0206408 A1* | 7/2019 | Qi | ..................... | H04N 21/2187 |
| 2019/0235717 A1* | 8/2019 | Seacat | ................... | G06F 3/0484 |
| 2019/0306486 A1* | 10/2019 | Nakajima | ............ | H04N 13/189 |
| 2021/0058352 A1* | 2/2021 | Fogu | ...................... | H04L 51/52 |

FOREIGN PATENT DOCUMENTS

| | | |
|---|---|---|
| CN | 30506602 S | 3/2019 |
| WO | WO-2019-154095 A1 | 8/2019 |

OTHER PUBLICATIONS

First Office Action with English translation, issued by the Indian Patent Office, dated Feb. 28, 2022, 6 pages, for corresponding Indian Patent Application No. 202134026209.

First Office Action with Search Report, issued by China National Intellectual Property Administration (CNIPA) dated Feb. 7, 2023, 8 pages, in corresponding Chinese Patent Application No. 202010542784.6.

\* cited by examiner

METHOD AND APPARATUS FOR DISPLAYING WIDGET

CROSS-REFERENCE TO RELATED APPLICATIONS

This application is based upon and claims priority to Chinese Patent Application No. 202010542784.6, filed Jun. 15, 2020, the entire content of which is incorporated herein by reference.

TECHNICAL FIELD

The disclosure relates to the field of computer technology, in particular to methods, non-transitory computer-readable media, and apparatuses for displaying a widget.

BACKGROUND

With the development of internet technology, more and more applications (APPs) (such as video playing APP, live broadcast APP, social networking APP, and the like) have been widely integrated into the daily lives of users to facilitate work, study, and entertainment.

During usage of an application, some widgets may be displayed on a page of the application for prompting. For example, a "LIVE" identifier may be displayed on a live broadcast page during an ongoing live broadcast through the live broadcast APP, thus indicating that the live broadcast is in progress.

The widgets in the related art are typically fixed widgets (e.g., the aforementioned "LIVE" identifier) developed for a dedicated function, and cannot display the content in an adaptive manner.

SUMMARY

According to the disclosure, a method, an apparatus and a system for displaying a widget are provided, thus solving at least the problem in the related art that the content of widget cannot be displayed in an adaptive manner. The technical solution of the disclosure is as follows.

According to some arrangements, a method for displaying a widget includes acquiring display content and timing duration of the widget based on a task achieved by a current page, displaying the widget with the display content on the current page and recording time information, the time information being used for indicating displaying duration of the widget, updating the widget for displaying that the task is in a completed state in response to the displaying duration reaching to the timing duration.

According to some arrangements, an apparatus for displaying a widget includes an acquiring unit, configured to acquire display content and timing duration of the widget based on a task achieved by a current page, and a displaying unit, configured to display the widget with the display content on the current page and recording time information. The time information is used for indicating displaying duration of the widget. The displaying unit is further configured to update the widget for displaying that the task is in a completed state in response to the displaying duration reaching to the timing duration.

According to some arrangements, a device for displaying a widget includes a processor; and a memory, configured to store instructions executable by the processor; wherein the processor is configured to perform the method for displaying the widget as described above by executing the instructions.

According to some arrangements, a non-transitory storage medium includes instructions therein such that, when executed by a processor of a device for displaying a widget, the processor performs the method for displaying the widget as described above.

According to some arrangements, a computer program product includes at least one non-transitory computer-readable medium configured to store instructions interpretable by at least one processor for implementing the method for displaying the widget as described above.

It is to be understood that both the foregoing general description and the following detailed description are example and explanatory only and are not restrictive of the disclosure.

BRIEF DESCRIPTION OF THE DRAWINGS

The accompanying drawings, which are incorporated in and constitute a part of the specification, illustrate embodiments consistent with the disclosure and, together with the specification, serve to explain the principles of the disclosure and are not to be construed as limiting the disclosure.

DETAILED DESCRIPTION

In order to make the technical solutions of the disclosure better understood by those skilled in the art, the technical solutions in the embodiments of the disclosure will be clearly and completely described below with reference to the accompanying drawings.

It should be noted that the terms "first," "second," and the like in the description and claims of the disclosure and in the above-described drawings are used for distinguishing between similar elements and not necessarily for describing a particular sequential or chronological order. It is to be understood that the data as such described may be interchangeable under appropriate circumstances such that the embodiments of the disclosure described herein can also be operated in sequences other than those illustrated or otherwise described herein. The implementations described in the example embodiments below are not intended to represent all implementations consistent with the disclosure. Rather, they are merely examples of apparatus and methods consistent with certain aspects of the disclosure, as detailed in the appended claims.

Figure 1:
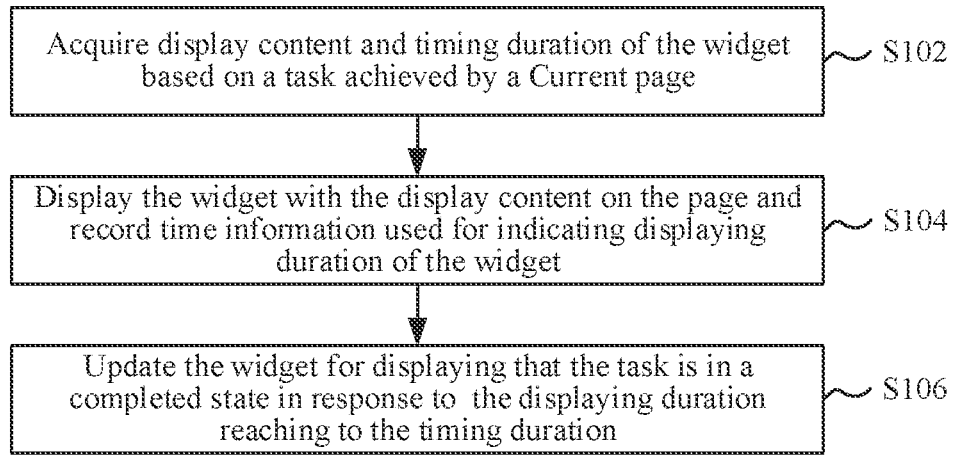
FIG. 1 is a flowchart illustrating a method for displaying a widget according to an example embodiment.

FIG. 1 is a flowchart illustrating a method for displaying the widget according to an example embodiment. As shown in FIG. 1, the method 100 for displaying the widget is applied to an apparatus (e.g., a mobile terminal) for displaying the widget, and includes the following steps.

In S102, display content and timing duration of the widget are acquired based on a task achieved by a current page.

In the page 200 shown in FIG. 2, the task achieved by the page 200 may be as follows. If the browsing time of the user on the page reaches 10 seconds, a red heart value of 1000 may be appointed to the user. Herein, the red heart value may serve as a virtual article over the Internet and can be used for enabling the user to exchange an authority, improve the popularity of the user and the like.

In some embodiments, the display content of the widget may be characters, icons, and the like. In the example shown in FIG. 2, the display content of the widget includes a red heart icon and a plurality of characters: "browsing page gets 1000 hearts".

In some embodiments, the timed duration of the widget may be 10 seconds, 5 seconds, or the like. The timing may be started after the widget is displayed, and after the timing is finished, the widget may be displayed to indicate that the task achieved by the page is in a completed state.

In S104, the widget is displayed with the display content on the page and time information is recorded. The time information is used for indicating displaying duration of the widget.

In some embodiments, the widget is displayed when a display condition of the widget is met. The display condition of the widget in some embodiments may be, for example, a user opens a certain page; the user activates a certain button or the like on the page, which is not specifically limited in the embodiments.

For example, when the user opens a certain page, the widget is displayed on the page with the display content, and timing is started for recording the time information. For another example, when the user clicks a certain button on the page, the widget is displayed on the page with the display content, and the timing is started for recording the time information.

In S106, in response to the displaying duration reaching to the timing duration, the widget is updated for displaying that the task is in a completed state.

Figure 2:
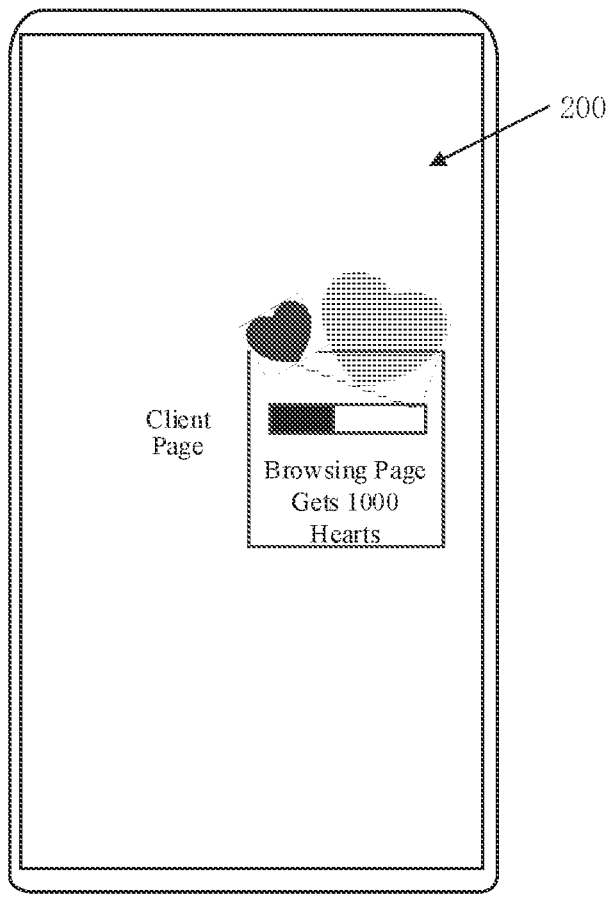
FIG. 2 is a schematic diagram illustrating displaying of the widget according to an example embodiment.

In the example shown in FIG. 2, for example, after the timing duration is reached, the display content "browsing page gets 1000 hearts" may be replaced with "task completed".

Optionally, after the timing duration is reached, the widget may be provided with an entrance for returning to the previous page. In the example shown in FIG. 2, after the timed duration is reached, a button with content of "return to main page" may be displayed in the widget, and when the user clicks the button, it automatically jumps to the main page (i.e., the previous page of the current page).

According to the method for displaying the widget provided by the disclosure, the display content and the timing duration of the widget can be acquired according to the task achieved by the current page; the widget can be displayed with the display content and time information is recorded for indicating displaying duration of the widget; in response to the displaying duration reaching to the timing duration, the widget is updated for displaying that the task is in the completed state. In this way, the widget can be displayed with corresponding content according to the task achieved by the current page, a timing function can be realized for the widget, and the completed state of the task can be displayed based on the timing function, thus enriching the display content of the widget, and enabling the widget to be displayed in a manner adaptive to the task.

Optionally, before the widget is displayed with the display content on the page in the embodiment 100, the method may further include: providing an entrance for opening a second page on the widget in response to the displaying duration reaching to the timing duration; opening the second page in response to receiving an input with respect to the entrance, wherein the second page is a parent page of the current page; and displaying the widget with general content on the second page.

In some embodiments, the widget including the general content may be displayed by displaying only a widget icon. For example, in the example shown in FIG. 2, the general content of the widget may include content other than the progress bar component in the middle and the character "browsing page gets 1000 hearts".

According to the embodiments, the entrance for returning to the second page may be provided on the widget, so that the user can conveniently and quickly return to the second page after completing the task achieved by the current page, thus improving the user experience.

Optionally, before the widget is displayed with the display content on the page in the embodiment 100, the method may further include: generating a timing thread; generating a message passing object, wherein the message passing object is used for passing timing information of the timing thread to a progress bar component; and adding the progress bar component into an extensible markup language, wherein the extensible markup language is used for controlling a display mode of the page. In this way, S104 of the embodiment 100 may include: starting the timing thread, and displaying the widget with the progress bar component and the display content on the current page by passing the timing information to the progress bar component through the message passing object.

The timing thread generated in some embodiments may be used for implementing a countdown task, for example, counting down with seconds displayed. In one example, after the timing thread is started, a new message (or referred to as information) may be added to a message queue through the message passing object as described later every 1 second, and the operation of counting down "+1" may be executed when this message is processed. When the counting down (e.g., 10 seconds) is completed, the timing thread may be ended.

Optionally, in some embodiments, the generated timing thread may be saved in the executor. Herein, the executor refers to a thread management tool provided by the Android platform for facilitating the management of threads by developers, for example, facilitating the subsequent scheduling of the timing thread.

The message passing object in some embodiments may be a handler, which refers to a component in the Android system message mechanism and may be used for sending or processing messages. For example, as mentioned above, after the timing thread is started, a new piece of information may be generated every 1 second, and the timing information may be a message generated by the timing thread to implement countdown.

Optionally, the progress bar component in some embodiments may be ProgressBar. Herein, the ProgressBar refers to a progress bar component provided by Android for developers. In some embodiments, countdown information can be displayed on the client page through the ProgressBar.

The extensible markup language in some embodiments may be an xml language, and the display mode of the client page may be controlled by the xml language.

The widget mentioned in some embodiments may refer to FIG. 2, including a progress bar component, which may be used for displaying countdown information based on the timing thread. For example, a full-state display length of the progress bar component corresponds to a state in which the timing thread is not started, and a total duration corresponding to the timing thread may be, for example, 10 seconds. After the timing thread is started, a message is generated every 1 second and passed to the progress bar component, thus correspondingly reducing the display length of the progress bar component by one tenth, until the timing thread reaches the total duration and ends. Finally, the display length of the progress bar component is 0.

Based on the progress bar component provided in some embodiments, the embodiment 100 may further include: when the display ending condition of the widget is met, stopping the timing thread, and no longer displaying the widget with the progress bar component. In some embodiments, the display time of the widget can be adjusted. For example, the widget is controlled to automatically disappear after being displayed for 10 seconds, so that the widget can be conveniently used in various application scenarios, thus extending the application range of the widget.

Based on the method for displaying the widget according to the disclosure, an implementation mechanism including the progress bar component and the user-defined Handler can be utilized, thus achieving a higher degree of freedom for coding in a later stage, customizing more functions, and realizing better expansibility and maintainability.

Optionally, in some embodiments, if the total countdown duration of the timing thread changes, a progress change interface may be represented to the user, so that the user can change the total countdown duration conveniently, thus improving the generality and flexibility of the widget.

Optionally, in some embodiments, the method may further include: generating an external interface for the progress bar component, wherein the external interface is used for performing one or more functions of: starting new timing (start); stopping timing (stop); pausing timing (pause); or resuming paused timing (resume).

It is to be understood that, among the above listed functions, one function may be implemented through one interface, or multiple functions may be integrated in one interface.

According to some embodiments, the progress bar component can be conveniently called by an external utilization component according to the service logic through the provided external interface, thus achieving the aim of reusability and improving the universality of the widget.

Optionally, the display content of the widget mentioned in embodiment 100 includes a plurality of characters, for example, the characters include "browsing page gets 1000 hearts" shown in the widget of FIG. 2. In the embodiment shown in FIG. 2, the user can automatically obtain 1000 hearts when the browsing time in the client page reaches 10 seconds. As mentioned above, the hearts may serve as virtual articles over the internet and can be used for exchanging the authority, promoting the popularity and the like.

Based thereon, the displaying the widget with the display content on the page according to embodiment 100 may include one of the following.

1) Displaying the plurality of characters within the widget by adjusting a font size of the plurality of characters.

In some embodiments, based on the total length of the area of the widget in which the characters can be displayed (hereinafter referred to as the widget length, which may be a length of one line, or a total length of multiple lines), when the total length of the characters to be displayed is greater than the widget length, the font size of the characters may be gradually reduced. Then the total length of the characters is again measured and compared with the widget length, until the total length of the characters is less than or equal to the widget length. At that time, the whole process may be stopped, and the final result is rendered and displayed.

When the widget length is great while the number of characters to be displayed is small, the font size of the characters may be gradually enlarged, so that all the characters can be displayed in the widget until the font size of the characters reach the maximum value.

2) Adjusting the font size of the plurality of characters until the font size of the plurality of characters reaches the minimum value.

As can be understood, if the font size of the characters displayed in the widget is too small, it will cause adverse effect on the browsing experience of the user. In order to enhance the browsing experience of the user, the minimum value of the font size of the characters may be additionally set.

In this way, when the total length of the characters to be displayed is larger than the widget length, the font size of the characters may be gradually reduced. Then, the total length of the characters is again measured and compared with the widget length. The whole process can be stopped until the font size of the characters reaches the minimum value, and the final result is rendered and displayed.

Optionally, in some embodiments, since all the characters cannot be displayed, prompt information such as an ellipsis may be displayed at the end position of the displayed characters, so as to prompt the user that all the characters cannot be displayed.

According to the embodiments, the font size of the characters can be dynamically adjusted according to needs, so that the characters can be displayed in the widget in an adaptive manner, thus improving the browsing experience of user.

In order to implement the function of automatically adjusting the font size of characters (hereinafter referred to as the content adaptive function) mentioned in the above embodiments, optionally, before displaying the widget with the display content on the page in the embodiment 100, the method further includes: generating a service proxy including a TextPaint class in a TextView class, wherein the TextPaint class provides a method for adjusting the font size of the plurality of characters.

As one implementation manner, the embodiments may be implemented as follows. A subclass is inherited based on the TextView to serve as an external interface of the content adaptive function. A service proxy class TextSizeAdjustableDelegate is newly generated for storing all function codes related to the content adaptive function. The TextPaint class in the TextView class may be input into the proxy class, facilitating measuring a length of the current characters to be displayed. The measurement operation may be triggered when the content to be displayed is updated. When the total length of the characters is greater than the widget length, the font size of the plurality of characters may be gradually reduced. Then, the length of the characters is again measure and compared to the widget length until the minimum font size is reached or the length of the characters is less than or equal to the widget length. At that time, the whole process can be stopped and the final result can be rendered.

As one implementation manner, some embodiments may be implemented as follows.

1. A subclass is inherited from the TextView to serve as an external interface of the content adaptive module.

2. A delegate class is created for representing setText ( ) and the like of the TextView, and the character size can be dynamically adjusted in the proxy class.

3. The TextPaint in the TextView is obtained and, in combination with the Layout class, used for gradually reducing the font size of the current characters until the minimum font size is reached or the character length is less than or equal to the widget length, at which time the whole process is stopped.

4. The characters are displayed by refreshing the TextView after the font size of the characters is determined.

The content adaptive function mentioned in the embodiments is not supported by native Android system. According to the embodiments, the relationship between the font size of the characters and the widget length can be coordinated through the above two implementation manners, thus displaying all the characters as completely as possible while ensuring the viewing experience of the user. If the font size of the characters is determined to be smaller than the minimum font size, they are to be displayed in the minimum font size with an ellipsis displayed when they cannot be completely displayed.

In order to implement the content adaptive function, a logic used for dynamically adjusting the font size of characters may be extended based on the native control TextView, which may assign the rendering part of the characters to the native component, and dynamically determine the most appropriate font size by means of TextPaint and Layout.

Optionally, after the widget is displayed with the display content on the page in the foregoing embodiments, the method further includes: detecting a touch trajectory of an external medium on the page; and matching a display position of the widget with the touch trajectory by adjusting, based on the touch trajectory, the display position of the widget on the page.

The external medium may include a user's finger or the like.

For example, when the user clicks and drags the widget, the widget can move synchronously along with the movement of the user's finger, so that the user can conveniently adjust the display position of the widget on the client page at any time, thus avoiding the condition that the widget shields important information on the client page, satisfying the personalized requirements of the user, and improving the user experience.

Optionally, the aforementioned adjusting the display position of the widget on the page based on the touch trajectory further includes: determining, when a touch ending condition is met, an attaching point on a boundary of the page closest to the touch ending position; and determining a final display position of the widget based on a position of the attaching point.

According to the embodiments, an automatic attaching function can be achieved for the widget, so that the widget can be automatically attached on the boundary of the client page, thus avoiding the condition that the widget shields important information on the client page, and improving the user experience.

According to the embodiments, the problem of a typical widget which cannot move its position can be solved, without requiring adaptation to full-screen display or navigation bar, thus improving the user experience.

In order to realize the dragging function in the above embodiments, a hand-following animation may be generated for the touch event of the widget. With respect to the functional part of rebounding and attaching to the edge of the screen, the bang screen at the top and the navigation bar that may exist at the bottom need to be adapted first, so as to determine the boundary range of the rebounding attachment, and then move the widget smoothly to the screen boundary through Scroll.

Optionally, before the embodiment is performed, the onTouchEvent may be directly reloaded in the widget to recognize the input of user gesture, and the mapping relationship between the dragging operation of the user and the movement of the widget is may be established by means of setX and setY, so as to realize the function of dragging and moving the widget with the hand. Then, a lifting action of the user's finger may be detected, thus activating the operation of rebounding and attaching the widget when the action is triggered., With the adaptive full screen and the position of the navigation bar as determined, a Scroller may be activated to achieve a smooth rebounding action.

As one implementation manner, the dragging function mentioned in the above embodiments can be implemented as follows.

1. The onTouchEvent method is reloaded, calling requestDisallowInterceptTouchEvent ( ) to prevent parent from intercepting the touch event, processing the touch event depending on classification.

2. A finger boundary is detected when it is determined a finger presses on the screen, and if the finger boundary is located within the screen range, the event is consumed and a position pressed by the finger is recorded.

3. When a move event (finger dragging) occurs, a sliding distance and direction generated by the finger are transmitted to the widget, enabling the widget to represent a finger-following movement effect.

4. When an up event (the finger leaves the screen to stop dragging) occurs, a trajectory between the current position and the nearest attaching point is calculated, and the Scroller is activated to generate a smooth animation.

Optionally, the implementation codes of the widget mentioned in the foregoing embodiments may be located at the Activity layer, so that the widget can be displayed on a single page of the application program, thus improving the flexibility of displaying the widget, and facilitating control of displaying the widget on a specified page.

Optionally, the implementation codes of the widget mentioned in the foregoing embodiments may also be located at the Window layer, so that the widget can be displayed in multiple display pages of the application program, rather than being displayed in a single page, thus improving the universality thereof.

Figure 3:
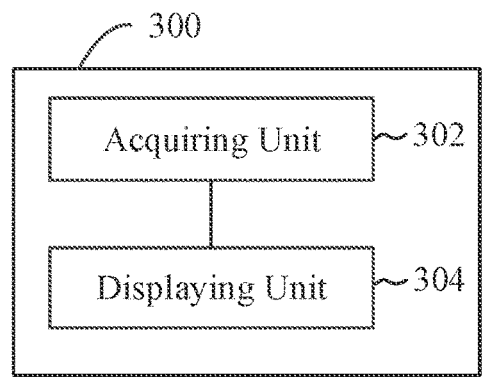
FIG. 3 is a block diagram illustrating an apparatus for displaying a widget according to an example embodiment.

FIG. 3 is a block diagram illustrating an apparatus for displaying the widget according to an example embodiment. Referring to FIG. 3, the apparatus 300 includes an acquiring unit 302 and a displaying unit 304.

The acquiring unit 302 is configured to acquire display content and timing duration of the widget based on a task achieved by a current page.

The displaying unit 304 is configured to display the widget with the display content on the current page and recording time information, wherein the time information is used for indicating displaying duration of the widget.

The displaying unit 304 may be further configured to update the widget for displaying that the task is in a completed state in response to the displaying duration reaching to the timing duration.

According to the apparatus for displaying the widget provided by the disclosure, the display content and the timing duration of the widget can be acquired according to the task achieved by the current page; the widget can be displayed with the display content, and time information is recorded for indicating displaying duration of the widget; in response to the displaying duration reaching to the timing duration, the widget is updated for displaying that the task is in the completed state. In this way, the widget can be displayed with corresponding content according to the task achieved by the current page, a timing function can be realized for the widget, and the completed state of the task can be displayed based on the timing function, thus enriching the display content of the widget, and enabling the widget to be displayed in a manner adaptive to the task.

In some possible embodiments, the displaying unit 304 may be further configured to provide an entrance for opening a second page on the widget in response to the displaying duration reaching to the timing duration; open the second page in response to receiving an input with respect to the entrance, wherein the second page is a parent page of the current page; and display the widget with general content on the second page.

In some possible embodiments, the apparatus 300 may further include a generating unit, configured to: generate a timing thread; generate a message passing object, wherein the message passing object is used for passing timing information of the timing thread to a progress bar component; start the timing thread, and display the widget with the progress bar component and the display content on the current page by passing the timing information to the progress bar component through the message passing object.

In some possible embodiments, the generating unit may be further configured to generate an external interface for the progress bar component, wherein the external interface is used for performing one or more: starting new timing; stopping timing; pausing timing; or resuming paused timing.

In some possible embodiments, the display content includes a plurality of characters, and the displaying unit 304 may be further configured to: adjust a font size of the characters so that the widget displays all characters or adjust the font size as a smallest font.

In some possible embodiments, the apparatus 300 may further include a generating unit, configured to generate a service proxy including a TextPaint class in a TextView class, wherein the TextPaint class provides a method for adjusting the font size of the plurality of characters.

In some possible embodiments, the apparatus 300 may further include a detecting unit, configured to detect a touch trajectory of an external medium on the page; wherein the displaying unit 304 may be further configured to adjust a display position of the widget based on the touch trajectory, wherein the display position matches the touch trajectory.

In some possible embodiments, the displaying unit 304 may be further configured to determine an attaching point in response to the touch trajectory being terminated, wherein the attaching point is closest to an ending position of the touch trajectory on a boundary of the current page; and determine a final display position of the widget based on a position of the attaching point.

In some possible embodiments, implementation codes of the widget are located in an Activity layer; or the implementation codes of the widget are located in a Window layer.

With regard to the apparatus in the above-described embodiments, the specific manner in which each module/unit performs the operation has been described in detail in the embodiments related to the method and, thus, will not be elaborated herein.

Figure 4:
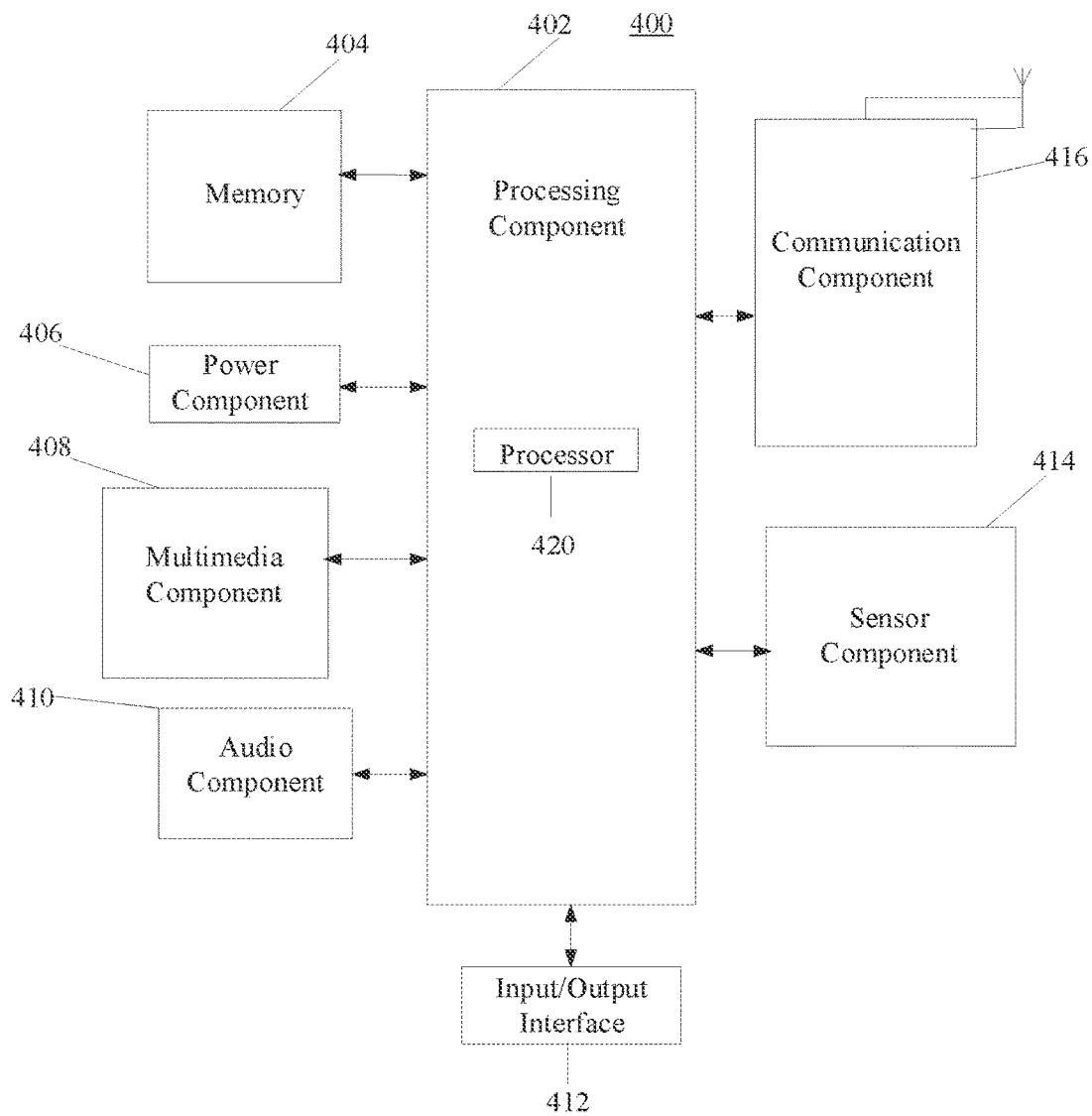
FIG. 4 is a block diagram illustrating a device for displaying a widget according to an example embodiment.

FIG. 4 is a block diagram illustrating a device 400 for displaying the widget according to an example embodiment. For example, the device 400 may be a mobile phone, a computer, a digital broadcast terminal, a messaging device, a game console, a tablet device, a medical device, an exercise device, a personal digital assistant, and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 is generally configured to control overall operation of the device 400, such as operations associated with display, telephone calls, data communications, camera operations, and recording operations. The processing component 402 may include one or more processors 420 configured to execute instructions to perform all or a portion of the steps of the methods described above. Further, the processing component 402 may include one or more modules that facilitate interaction between the processing component 402 and other components. For example, the processing component 402 may include a multimedia module to facilitate interaction between the multimedia component 408 and the processing component 402.

The memory 404 is configured to store various types of data to support operations at the device 400. Examples of such data include instructions for any application or method operating on the device 400, contact data, phonebook data, messages, pictures, videos, and so on. The memory 404 may be implemented by any type or combination of volatile or non-volatile memory devices such as Static Random Access Memory (SRAM), electrically erasable programmable read-only memory (EEPROM), erasable programmable read-only memory (EPROM), programmable read-only memory (PROM), read-only memory (ROM), magnetic memory, flash memory, magnetic or optical disks.

Power components 406 is configured to provide power to the various components of device 400. The power components 406 may include a power management system, one or more power supplies, and other components associated with generating, managing, and distributing power for the device 400.

The multimedia component 408 may include a screen that provides an output interface between the device 400 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, slide, and gestures on the touch panel. The touch sensor may not only sense the boundary of a touch or slide action, but also detect the duration and pressure associated with the touch or slide operation. In some embodiments, the multimedia component 408 includes a front camera and/or a rear camera. The front camera and/or the rear camera may receive external multimedia data when the device 400 is in an operational mode, such as a shooting mode or a video mode. Each front camera and rear camera may include a fixed optical lens system or have a focal length and optical zoom capability.

The audio component 410 is configured to output and/or input audio signals. For example, the audio component 410 may include a microphone (MIC) configured to receive external audio signals when the device 400 is in an operational mode, such as a call mode, a recording mode, and a voice recognition mode. The received audio signals may further be stored in the memory 404 or transmitted via the communication component 416. In some embodiments, the audio component 410 may also include a speaker for outputting audio signals.

The I/O interface 412 is configured to provide an interface between the processing component 402 and peripheral interface modules, which may be keyboards, click wheels, buttons, and the like. These buttons may include, but are not limited to, a home button, a volume button, a start button, and a lock button.

The sensor component 414 may include one or more sensors for providing various aspects of status assessment for the device 400. For example, the sensor component 414 may be configured to detect the open/closed state of the device 400, the relative positioning of components which may include, for example, a display and a keypad of the device 400. The sensor component 414 may also be configured to detect a change in the position of the device 400 or a component thereof, the presence or absence of user contact with the device 400, orientation or acceleration/deceleration of the device 400, and a change in the temperature of the device 400. The sensor component 414 may include a proximity sensor configured to detect the presence of a nearby object without any physical contact. The sensor component 414 may also include a light sensor, such as a CMOS or CCD image sensor, for use in imaging applications. In some embodiments, the sensor component 414 may also include an acceleration sensor, a gyroscope sensor, a magnetic sensor, a pressure sensor, or a temperature sensor.

The communication component 416 is configured to facilitate wired or wireless communication between the device 400 and other devices. The device 400 may access a wireless network based on a communication standard, such as WiFi, an operator network (such as 2G, 3G, 4G, or 5G), or a combination thereof. In some example embodiments, the communication component 416 may be configured to receive broadcast signals or broadcast related information from an external broadcast management system via a broadcast channel. In some example embodiments, the communication component 416 may further include a near field communication (NFC) module to facilitate short-range communications. For example, the NFC module may be implemented based on radio frequency identification (RFID) technology, infrared data association (IrDA) technology, ultra wideband (UWB) technology, Bluetooth (BT) technology, and the like.

In some example embodiments, the device 400 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components for performing the above-described methods.

In some example embodiments, there is further provided a non-transitory computer-readable storage medium including instructions, such as the memory 404 including instructions, which are executable by the processor 420 of the device 400 to perform the method for displaying the widget as described above. For example, the non-transitory computer readable storage medium may be a ROM, a random access memory (RAM), a CD-ROM, a magnetic tape, a floppy disk, an optical data storage device, and the like.

It should be noted that, since the method for displaying the widget executed by the device 400 in the embodiments has the same or corresponding technical features as the method for displaying the widget in the foregoing embodiment 100, the detailed description of the method in the embodiments may refer to the description of that in the foregoing embodiment 100, and the detailed description thereof is not repeated herein.

In some example embodiments, there is further provided a computer program product that includes at least one non-transitory computer readable medium storing instructions interpretable by at least one processor for implementing the method for displaying the widget as described above.

It should be noted that, since the method for displaying the widget executed by the computer program product in the embodiments has the same or corresponding technical features as the method for displaying the widget in the foregoing embodiment 100, the detailed description of the method in the embodiments may refer to the description of that in the foregoing embodiment 100, and the detailed description thereof is not repeated herein.

Those skilled in the art will readily contemplate other embodiments of the disclosure after considering the specification and practicing the disclosure disclosed herein. This application is intended to cover any variations, uses, or adaptations of the disclosure that conform to the general principles of the disclosure and include the common general knowledge or conventional technical means in the technical field not disclosed by the disclosure. It is intended that the specification and examples be considered as example only, with a true scope and spirit of the disclosure being indicated by the claims.

It should be understood that the disclosure is not limited to the precise structure that has been described above and shown in the drawings, and various modifications and changes can be made without departing from the scope thereof. The scope of the disclosure is limited only by the appended claims.

What is claimed is:

1. A method for displaying a widget, comprising:
acquiring display content and timing duration of the widget based on a task achieved by a current page, wherein the task comprises performing a certain operation and a lasting time of the certain operation reaches the timing duration, and the display content is used for prompting a user to perform the certain operation over the time duration;
displaying the widget with the display content on the current page and recording time information, wherein the time information is used for indicating the lasting time of the certain operation; and
displaying the widget with an updated display content in response to the lasting time reaching to the timing duration, wherein the updated display content is used for indicating that the task is in a completed state.

2. The method of claim 1, further comprising:
providing an entrance for opening a second page on the widget in response to the displaying duration reaching to the timing duration;
opening the second page in response to receiving an input with respect to the entrance, wherein the second page is a parent page of the current page; and
displaying the widget with general content on the second page.

3. The method of claim 1, wherein said recording time information comprises:
generating a timing thread; and
generating a message passing object, wherein the message passing object is used for passing timing information of the timing thread to a progress bar component;
wherein, said displaying the widget with the display content on the current page comprises:
starting the timing thread, and displaying the widget with the progress bar component and the display content on the current page by passing the timing information to the progress bar component through the message passing object.

4. The method of claim 3, further comprising:
generating an external interface for the progress bar component, wherein the external interface is used for one or more of: starting timing, stopping timing, pausing timing, or resuming paused timing.

5. The method of claim 1, wherein the display content comprises a plurality of characters, and said displaying the widget with the display content on the current page comprises:
- displaying all characters by adjusting a font size of the characters; or
- adjusting the font size to a smallest font.

6. The method of claim 5, further comprising:
- generating a service proxy comprising a TextPaint class in a TextView class, wherein adjusting the font size of the plurality of characters is based on the TextPaint class.

7. The method of claim 1, further comprising:
- detecting a touch trajectory of an external medium on the current page; and
- adjusting a display position of the widget based on the touch trajectory, wherein the display position matches the touch trajectory.

8. The method of claim 7, wherein said adjusting display position of the widget based on the touch trajectory comprises:
- determining an attaching point in response to the touch trajectory being terminated, wherein the attaching point is closest to an ending position of the touch trajectory on a boundary of the current page; and
- determining a final display position of the widget based on a position of the attaching point.

9. The method of claim 7, wherein implementation codes of the widget are located in Activity layer or Window layer.

10. A device for displaying a widget, comprising:
- a processor; and
- a memory, configured to store instructions executable by the processor;
- wherein the processor is configured to:
- acquire display content and timing duration of the widget based on a task achieved by a current page, wherein the task comprises performing a certain operation and a lasting time of the certain operation reaches the timing duration, and the display content is used for prompting a user to perform the certain operation over the time duration;
- display the widget with the display content on the current page and record time information, wherein the time information is used for indicating the lasting time of the certain operation; and
- display the widget with an updated display content in response to the lasting time of the certain operation reaching to the timing duration, wherein the updated display content is used for indicating that the task is in a completed state.

11. The device of claim 10, wherein the processor is further configured to:
- provide an entrance for opening a second page on the widget in response to the displaying duration reaching to the timing duration;
- open the second page in response to receiving an input with respect to the entrance, wherein the second page is a parent page of the current page; and
- display the widget with general content on the second page.

12. The device of claim 10, wherein the processor is further configured to:
- generate a timing thread;
- generate a message passing object, wherein the message passing object is used for passing timing information of the timing thread to a progress bar component; and
- start the timing thread, and display the widget with the progress bar component and the display content on the current page by passing the timing information to the progress bar component through the message passing object.

13. The device of claim 12, wherein the processor is further configured to:
- generate an external interface for the progress bar component, wherein the external interface is used for one or more of: starting timing, stopping timing, pausing timing, or resuming paused timing.

14. The device of claim 10, wherein the display content comprises a plurality of characters, and the processor is further configured to:
- display all characters by adjusting a font size of the characters; or
- adjust the font size to a smallest font.

15. The device of claim 14, wherein the processor is further configured to:
- generate a service proxy comprising a TextPaint class in a TextView class,
- wherein adjusting the font size of the plurality of characters is based on the TextPaint class.

16. The device of claim 10, wherein the processor is further configured to:
- detect a touch trajectory of an external medium on the current page; and
- adjust a display position of the widget based on the touch trajectory, wherein the display position matches the touch trajectory.

17. The device of claim 16, wherein the processor is further configured to:
- determine an attaching point in response to the touch trajectory being terminated, wherein the attaching point is closest to an ending position of the touch trajectory on a boundary of the current page; and
- determine a final display position of the widget based on a position of the attaching point.

18. The device of claim 16, wherein,
- implementation codes of the widget are located in Activity layer or Window layer.

19. A non-transitory computer-readable storage medium, comprising instructions therein causing, when being executed by a processor of a device for displaying a widget, the device for displaying the widget to perform:
- acquiring display content and timing duration of the widget based on a task achieved by a current page, wherein the task comprises performing a certain operation and a lasting time of the certain operation reaches the timing duration, and the display content is used for prompting a user to perform the certain operation over the time duration;
- displaying the widget with the display content on the current page and recording time information, wherein the time information is used for indicating the lasting time of the certain operation; and
- displaying the widget with an updated display content in response to the lasting time of the certain operation reaching to the timing duration, wherein the updated display content is used for indicating that the task is in a completed state.

* * * * *